United States Patent [19]

Ogashi

[11] Patent Number: 4,956,596
[45] Date of Patent: Sep. 11, 1990

[54] VARIABLE SPEED DRIVE SYSTEM

[75] Inventor: Yoshihiro Ogashi, Funabashi, Japan

[73] Assignee: Kabushiki Kaisha Toshiba, Kawasaki, Japan

[21] Appl. No.: 422,551

[22] Filed: Oct. 17, 1989

[30] Foreign Application Priority Data

Oct. 17, 1988 [JP] Japan .................................. 63-259381

[51] Int. Cl.$^5$ .............................................. H02P 7/62
[52] U.S. Cl. .................... 318/801; 318/732; 318/778; 318/818
[58] Field of Search ............... 318/727, 732, 739, 740, 318/766, 767, 769, 772, 801, 807, 808, 811, 818, 819, 820, 778

[56] References Cited

U.S. PATENT DOCUMENTS

| | | | |
|---|---|---|---|
| 3,978,381 | 8/1976 | Yamamoto et al. | 318/732 |
| 4,652,807 | 3/1987 | Nagura | 318/732 X |
| 4,748,394 | 5/1988 | Watanabe | 318/807 |
| 4,812,730 | 3/1989 | Nakagawa et al. | 318/732 |

FOREIGN PATENT DOCUMENTS

| | | | |
|---|---|---|---|
| 60-05796 | 1/1985 | Japan | 318/801 |
| 61-221594 | 10/1986 | Japan | 318/801 |
| 8404214 | 10/1984 | PCT Int'l Appl. | 318/801 |

*Primary Examiner*—Bentsu Ro
*Attorney, Agent, or Firm*—Foley & Lardner, Schwartz, Jeffery, Schwaab, Mack, Blumenthal & Evans

[57] ABSTRACT

An a.c. variable speed drive system which can switch between a driving operation and regenerative operation of an inverter in accordance with the operation speed. This system includes a forced commutation type inverter for controlling a wound-rotor type induction motor at variable speed; an operation mode selection circuit for selectively outputting either a driving operation signal or a regenerative operation signal for the forced commutation type inverter by comparing an operation speed feedback signal from the would-rotor type induction motor with a predetermined judgement value; a forced commutation type inverter control circuit for causing the forced commutation type inverter to operate in a driving operation mode or a regenerative operation mode, in accordance with an output from the operation mode selection circuit; a connection circuit for supplying an output from a converter of the forced commutation type inverter to the wound-rotor type induction motor via a path suitable for the driving operation mode or the regenerative operation mode; and a switch circuit for switching a path of the connection circuit in accordance with an output of the operation mode selection circuit. The connection circuits include several switches.

5 Claims, 3 Drawing Sheets

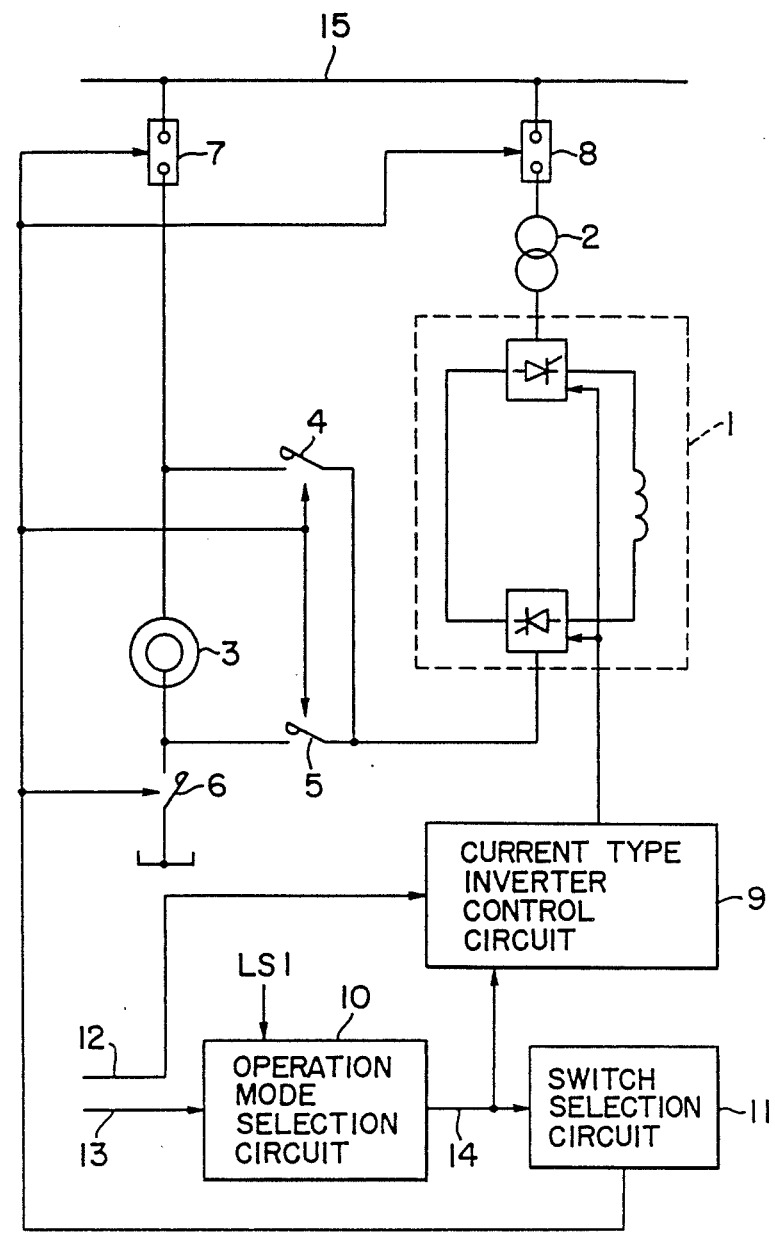
F I G. 1

VARIABLE SPEED DRIVE SYSTEM

BACKGROUND OF THE INVENTION

The present invention relates to an a.c. variable speed drive system for driving a wound-rotor type induction motor at variable speed.

As a well known method of driving a wound-rotor type induction motor at variable speed, there is the method of regulating the secondary resistor of the wound-rotor type induction motor by using a resistor, and the method of regenerating the secondary power of the wound-rotor type induction motor at the commercial power supply by using a Scherbius apparatus or the like.

The method using a resistor is associated with the problems that power is consumed by the resistor so that the efficiency of the overall system lowers, and that maintenance labor is required for the resistor.

The method using the Scherbius apparatus is also associated with the problem that although the rating of the apparatus is small if the range of speed variation is narrow, if a wide range of speed variation is necessary, the rating of the Scherbius apparatus becomes too large and not economical, and moreover it becomes necessary to use a starting resistor such as a liquid type resistor.

SUMMARY OF THE INVENTION

It is an object of the present invention to provide an a.c. variable speed drive system which can use an inverter whose capacity is about half that of a Scherbius apparatus even for a wide range of speed variation from 0% to 100%, without the need to use a starting resistor.

According to an a.c. variable speed drive system of this invention, in the start and low speed operation range of a wound-rotor type induction motor, the primary windings of the wound-rotor type induction motor are connected to the output side of the converter of a current type inverter to thereafter start and operate the wound-rotor type induction motor. In a high speed operation range after the speed of the wound-rotor type induction motor increases, the secondary windings of the wound-rotor type induction motor is connected to the output side of the converter of the current type inverter to thereafter cause the current type inverter to enter in a regenerative operation and continue the operation of the wound-rotor type induction motor.

The wound-rotor type induction motor can therefore be driven at variable speed without making the capacity of a forced commutation type inverter unnecessarily large and without a need of a starting resistor for the wound-rotor type induction motor.

BRIEF DESCRIPTION OF THE DRAWINGS

In the accompanying drawings,

FIG. 1 is a circuit diagram showing the structure of an embodiment of the a.c. variable speed drive system according to this invention;

DESCRIPTION OF THE PREFERRED EMBODIMENTS

Figure 2:
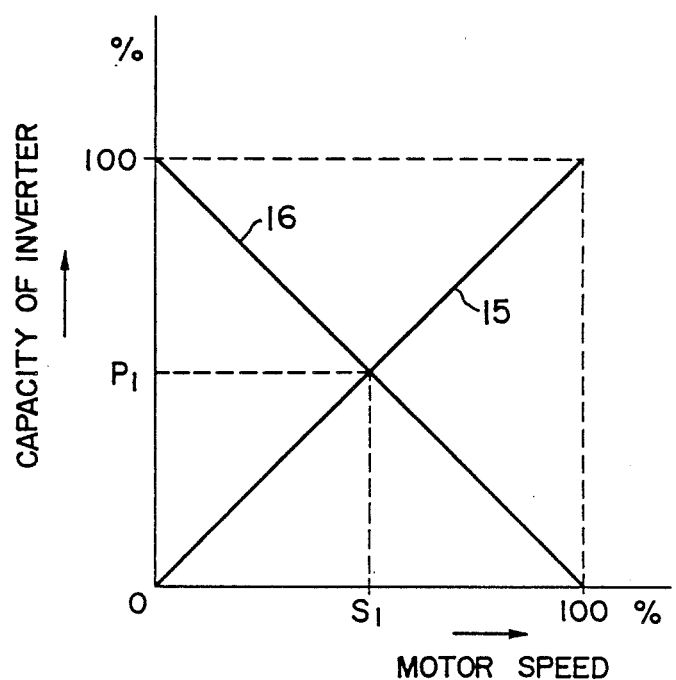
FIG. 2 is a graph illustrating the method of determining the capacity of a current type inverter.

Referring to FIG. 1, the primary side of a wound-rotor type induction motor 3 is connected via a switch 7 to a commercial power source line 15, and the secondary side thereof is connected to a neutral point via a switch 6.

The wound-rotor type induction motor 3 is controlled by a current type inverter 1 connected via a switch 8 to the power source line 15. An output from the current type inverter 1 is supplied via a switch 4 to the primary side of the motor 3, or via a switch 5 to the secondary side of the motor 3.

The current type inverter 1 is controlled by a current type inverter control circuit 9 in accordance with a speed reference signal 12 which is supplied to the circuit 9. There is also provided an operation mode selection circuit 10 which is inputted with a speed feedback signal 13 to determine whether the current type inverter 1 is to be driven in a driving operation mode or in a regenerative operation mode. The output of the operation mode selection circuit 10, i.e., an operation mode selection signal 14, is supplied to the current type inverter control circuit 9 and switch selection circuit 11. The switch selection circuit 11 controls the switches 4, 5, 6, 7 and 8.

Next, the operation of this embodiment will be described.

The operation mode selection circuit 10 judges whether the operation mode of the current type inverter 1 is the driving operation mode or the regenerative operation mode, in accordance with the speed feedback signal from the motor 3, and outputs the operation mode selection signal 14 to the switch selection circuit 11 and current type inverter control circuit 9.

How the capacity of the current type inverter is determined will be described with reference to FIG. 2.

In FIG. 2, the abscissa represents the speed of a wound-rotor type induction motor, and the ordinate represents the capacity of a current type inverter. A line 15 indicates the necessary capacity of a current type inverter relative to the speed of a wound-rotor type induction motor, the current type inverter being connected to the primary side of the motor which has a constant load torque characteristic. A line 16 indicates the necessary capacity of a current type inverter or Scherbius apparatus relative to the speed of a wound-rotor type induction motor, the current type inverter being connected to the secondary side of the motor which has a constant load torque characteristic.

It is apparent that if the current type inverter is connected to the secondary side of the wound-rotor type induction motor and driven in the regenerative operation mode, the inverter performs the same function as the Scherbius apparatus. With the capacity P of the current type inverter 1 being set larger than P1, the wound-rotor type induction motor can be driven with variable frequency in the range from speed 0 to S1 (%) by connecting the output side of the converter of the current type inverter 1 to the primary side of the wound-rotor type induction motor, whereas the wound-rotor type induction motor can be driven in a secondary power control mode in the range from speed S1 to 100 (%) by connecting the output side of the converter of the current type inverter 1 to the secondary side of the wound-rotor type induction motor.

The value of speed S1 differs in dependence upon the characteristics of the motor. In view of this, the operation mode selection circuit 10 is supplied with a level signal LS1 as a reference value of S1. The operation mode selection circuit 10 compares the speed feedback signal (FBK) with the level signal LS1 to output the above-described operation mode selection signal.

S1 is larger than or equal to FBK in the motor operation speed range from 0 to S1 (%). The operation mode selection signal 14 becomes "1" for example, so that the switch selection circuit 11 closes the switches 4, 6 and 8 and opens the switches 5 and 7. The current type inverter control circuit 9 causes the current type inverter 1 to be operated in the driving operation mode, so that the wound-rotor type induction motor 3 is driven in a primary frequency control mode, i.e., Variable Voltage Variable Frequency (VVVF) mode.

In the motor operation speed range from S1 to 100 (%), the operation mode selection signal 14 becomes "0" for example, so that the switch selection circuit 11 closes the switches 5, 7 and 8 and opens the switches 4 and 6. The current type inverter control circuit 9 causes the current type inverter 1 to be operated in the regenerative operation mode, so that the wound-rotor type induction motor 3 is driven in the secondary power control mode. If the motor operation speed is 100%, the wound-rotor type induction motor 3 may be driven with the commercial power source to thereby improve the system efficiency, by opening the switches 4, 5 and 8 and closing the switches 6 and 7.

As described above, according to the present invention, the wound-rotor type induction motor 3 can be driven in the speed range from 0 to 100 (%) without making the capacity of the current type inverter 1 unnecessarily large.

Further, according to the present invention, it is apparent that the Scherbius apparatus does not need to use a starting resistor for the wound-rotor type induction motor.

Figure 3:
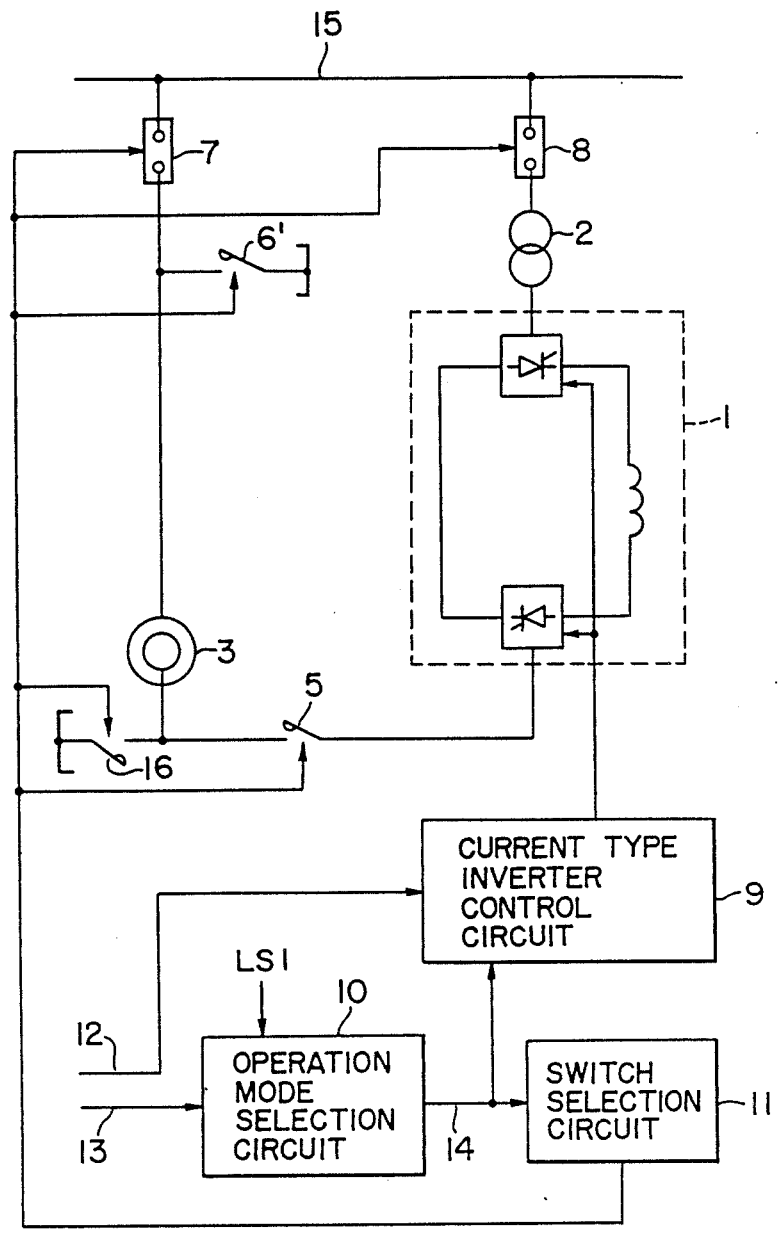
FIG. 3 is a circuit diagram showing the structure of another embodiment of the a.c. variable speed drive system according to this invention.

FIG. 3 is a circuit diagram showing another embodiment of this invention. Similar elements to those shown in FIG. 1 are represented by identical numerals, and the detailed description thereof is omitted.

Although this embodiment is similar in construction to the embodiment shown in FIG. 1, a switch 6' for switching between the inverter control and Scherbius control is connected between the primary side of the induction motor 3 and the neutral point. Although a switch 16 connected between the secondary side of the induction motor 3 and the neutral point is similar to the switch 6 shown in FIG. 1, it has quite a different function from the switch 6 and is used for operation at 100% speed as described later.

The operation of this embodiment will be described.

In the motor operation speed range from 0 to S1 (%), the switch selection circuit 11 closes the switches 5, 6' and 8 upon reception of the operation mode selection signal 14. The motor 3 is therefore operated in the primary frequency control mode under the driving operation mode of the inverter 1.

Next, in the motor operation speed range from S1 to 100 (%), the switch selection circuit 11 closes the switches 5, 7 and 8 and opens the switch 6' upon reception of the operation mode selection signal 14. The wound-rotor type induction motor 3 is therefore operated in the secondary power control mode under the regenerative operation mode of the current type inverter 1.

At 100% speed operation, the switches 5, 6' and 8 are opened and the switches 7 and 16 are closed to operate the wound-rotor type induction motor directly with the commercial power source.

The above-described embodiments use a current type inverter. Instead of the current type inverter, this invention is obviously applicable to a voltage type inverter having the function of driving operation and regenerative operation.

What is claimed is:

1. An a.c. variable speed drive system comprising:
   a forced commutation type inverter for controlling a wound-rotor type induction motor at variable speed;
   an operation mode selection circuit for selectively outputting either a driving operation signal or a regenerative operation signal for said forced commutation type inverter by comparing an operation speed feedback signal from said wound-rotor type induction motor with a predetermined judgement value;
   a forced commutation type inverter control circuit for causing said forced commutation type inverter to operate in a driving operation mode or a regenerative operation mode in accordance with an output from said operation mode selection circuit;
   a connection circuit for supplying an output from a converter of said forced commutation type inverter to said wound-rotor type induction motor via a path suitable for said driving operation mode or said regenerative operation mode; and
   a switch circuit for switching a path of said connection circuit in accordance with the output of said operation mode selection circuit.

2. An a.c. variable speed drive system according to claim 1, wherein said connection circuit comprises:
   a first switch for disconnecting a primary side of said wound-rotor type induction motor from a commercial power source line during the driving operation mode and connecting the primary side of said wound-rotor type induction motor to said commercial power source line during the regenerative operation mode;
   a second switch for connecting the primary side of said wound-rotor type induction motor to the output of the converter of said forced commutation type inverter during the driving operation mode and disconnecting the primary side of said wound-rotor type induction motor from the output of the converter of said forced commutation type inverter during the driving operation mode;
   a third switch for disconnecting a secondary side of said wound-rotor type induction motor from the output of the converter of said forced commutation type inverter during the driving operation mode and connecting the secondary side of said wound-rotor type induction motor to the output of the converter of said forced commutation type inverter; and
   a fourth switch for connecting the secondary side of said wound-rotor type induction motor to a neutral point during the driving operation mode and disconnecting the secondary side of said wound-rotor type induction motor from the neutral point during the regenerative operation mode.

3. An a.c. variable speed drive system according to claim 2, wherein said connection circuit further comprises a fifth switch for disconnecting said forced commutation type inverter from said commercial power source line only during 100% operation speed.

4. An a.c. variable speed drive system according to claim 1, wherein said connection circuit comprises:
- a first switch for disconnecting a primary side of said wound-rotor type induction motor from a commercial power source line during the driving operation mode and connecting the primary side of said wound-rotor type induction motor to said commercial power source line during the regenerative operation mode; and
- a second switch for connecting the primary side of said wound-rotor type induction motor to a neutral point during the driving operation mode and disconnecting the primary side of wound-rotor type induction motor from said neutral point during the regenerative operation mode; and
- a secondary side of said wound-rotor, type induction motor is connected to the output of the converter of said forced commutation type inverter.

5. An a.c. variable speed drive system according to claim 4, wherein said connection circuit further comprises:
- a third switch for connecting the secondary side of said wound-rotor type induction motor to said neutral point only during a 100% operation speed;
- a fourth switch for disconnecting the secondary side of said wound-rotor type induction motor from the output of the converter of said forced commutation type inverter only during the 100% operation speed; and
- a fifth switch for disconnecting said forced commutation type inverter from the commercial power source line only during the 100% operation speed.

* * * * *